(12) United States Patent
Qureshi

(10) Patent No.: US 8,905,315 B1
(45) Date of Patent: *Dec. 9, 2014

(54) POPULATING CALENDAR EVENT INFORMATION FIELDS OF AN ELECTRONIC CALENDAR FROM A SCAN OF A BAR CODE

(71) Applicant: Komel Qureshi, Weston, FL (US)

(72) Inventor: Komel Qureshi, Weston, FL (US)

(\*) Notice: Subject to any disclaimer, the term of this patent is extended or adjusted under 35 U.S.C. 154(b) by 0 days.

This patent is subject to a terminal disclaimer.

(21) Appl. No.: 14/246,609

(22) Filed: Apr. 7, 2014

Related U.S. Application Data

(63) Continuation of application No. 13/673,382, filed on Nov. 9, 2012, now Pat. No. 8,690,062.

(51) Int. Cl.
*G06K 7/10* (2006.01)
*G06K 15/12* (2006.01)
*G06Q 10/10* (2012.01)

(52) U.S. Cl.
CPC ........ *G06Q 10/1093* (2013.01); *G06Q 10/1095* (2013.01)
USPC ................ 235/462.41; 235/375; 235/462.11; 235/462.24

(58) Field of Classification Search
USPC .......... 235/462.41, 375, 487, 462.45, 472.01; 705/8
See application file for complete search history.

(56) References Cited

U.S. PATENT DOCUMENTS

| | | | |
|---|---|---|---|
| 2003/0182210 A1* | 9/2003 | Weitzman et al. | 705/27 |
| 2012/0226779 A1* | 9/2012 | Crucs | 709/219 |
| 2012/0290950 A1* | 11/2012 | Rapaport et al. | 715/753 |
| 2012/0325902 A1* | 12/2012 | Goyal et al. | 235/375 |
| 2014/0040919 A1* | 2/2014 | Arora et al. | 719/318 |

* cited by examiner

*Primary Examiner* — Edwyn Labaze
(74) *Attorney, Agent, or Firm* — Brian K. Buchheit; Scott M. Garrett; Patents on Demand P.A.

(57) ABSTRACT

One or more processors, executing program instructions stored on a non-transitory storage medium, can populate event information of an event into a set of electronic calendar event information fields of an electronic calendar of a user. Each of the set of information fields is populated using the event information obtained from a single optical scan of a bar code for the event. The bar code can include the event information optically encoded within the bar code or can include a link encoded within the bar code to a Web source from which the event information is automatically obtained.

40 Claims, 4 Drawing Sheets

POPULATING CALENDAR EVENT INFORMATION FIELDS OF AN ELECTRONIC CALENDAR FROM A SCAN OF A BAR CODE

CROSS-REFERENCE TO RELATED APPLICATION

This application claims the benefit of patent application Ser. No. 13/673, 382 filed on Nov. 9, 2012, which claims the benefit of Provisional Application Ser. No. 61/550,153, filed Nov. 10, 2011. application Ser. No. 13/673, 382 and Provisional 61/550,153 are herein incorporated by reference in its entirety.

BACKGROUND

The present invention relates to the field of electronic calendaring, and more specifically, populating calendar event information fields of an electronic calendar from a scan of a bar code.

With the proliferation of mobile personal computing devices such as smartphones and tablets that can be integrated with a person's information from other devices' desktop applications or remote web applications, society has turned more and more to electronic calendaring as a main method for keeping track of tasks and events. However, entering events from a printed source into an electronic calendar is time consuming and prone to human error. Information associated with events can be the time and date of the event as well as the location and, in some circumstances, an RSVP method and address or an event contact and contact address (for example, phone number, email address, mailing address, web address, IM, FACEBOOK, TWITTER, etc.).

Oftentimes, events on a printed source are posted to a bulletin board, a window display, or the like, and a bypasser may not have the time to stop and copy down all of the pertinent information. In other instances, events may be announced on flyers that are disseminated, invitations such as "save the dates" arriving in mailboxes or stuck under a car's windshield wiper, printed in magazines or newspapers, and the like. This requires an individual to keep the paper copies of the event notifications until he or she has had time to enter the event details into his or her electronic calendar or, if the paper source is not able to be collected by individuals (e.g., a publically posted calendar), requires an individual to immediately take the time to take down the information or return at a later time to do so. Both of these circumstances may lead to individuals forgetting about or overlooking an as of yet un-entered event.

DETAILED DESCRIPTION

Figure 1:
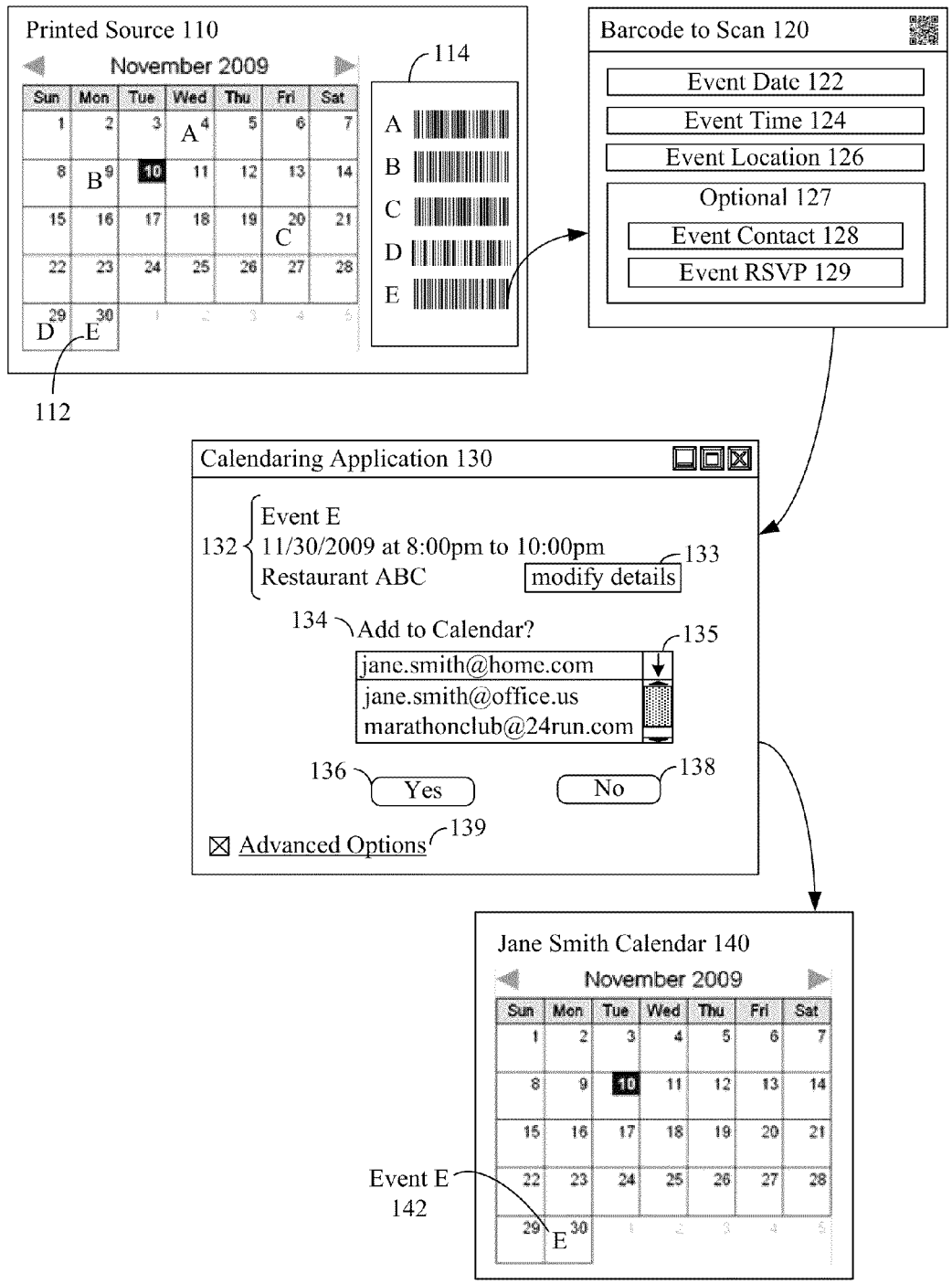
FIG. 1 is a depiction of a schematic diagram for storing an event from a printed source in an electronic calendar in accordance with embodiments of the inventive arrangements disclosed herein.

Events from a printed source (i.e., non-interactive visual display) such as flyers, mailings, magazines, posters, electronically displayed non-interactive images, and the like require users to manually enter these events and the associated details into their electronic calendar. While a user may capture an image of the event information with his or her device's camera or an application such as GOOGLE GOGGLES, special fonts, formatting and the like can oftentimes lead to problems with text parsing as options such as GOOGLE GOGGLES are targeted for visually identifying the object (the printed source itself) and not processing content or text data associated with the object. As such, manual transcription of event details into an electronic calendaring application is still a required step.

This is a cumbersome task and can also allow for the risk of a user accidentally overlooking crucial details, mistyping information associated with the event, only being able to copy down partial event information or overlooking the event entirely due to the event remaining un-entered in an individual's electronic calendar. Furthermore, any additional dates or information associated with the event along with event updates after the initial creation of the event in an electronic calendar can often be missed. Attempts to solve this problem place the burden of entering events and their associated information, event updates, and the like on the potential event attendee.

The disclosure provides a solution for storing an event from a printed source in an electronic calendar. The disclosure provided solution can allow for a barcode containing event data to be scanned, triggering the creation of one or more events corresponding to the data encoded in the barcode in an electronic calendar. The electronic calendaring application user can select to accept, decline or modify the created event data. The user can also perform additional tasks associated with the event, for instance RSVP-ing to an event owner, sharing the event with another individual when permitted, or adding the event to another individual's electronic calendar in lieu of, or in addition to, his or her electronic calendar.

One aspect of the disclosure can include a method for storing events from a printed announcement source in an electronic calendar. A printed announcement can be any non-interactive visual display. For example, a printed source can be a publically posted or distributed paper calendar or an electronically displayed non-interactive image. Such a method for storing events from a printed source in an electronic calendar can begin with an individual utilizing his or her mobile device to scan an event ID. The event ID can be in the form of a linear or matrix printed bar code (e.g., standard bar code, UPC, QR code, etc.). The event ID can include encoded information such as, but not limited to, event time and date, and event location. Optionally, the event ID can also include information such as an event contact name and contact information, as well as a possible event RSVP method and address. The event ID can be in lieu of human readable or commonly typed alphanumeric or special text information. In another embodiment, the event ID can be encrypted requiring an individual to have a decryption key to access the event information.

Responsive to the scanning of an event ID, the electronic calendaring application can receive a request to add a scanned calendar event ID as an event to an individual's electronic calendar. The individual can be the user of the application or another person whose calendar the individual has authority to modify. Utilizing the captured calendar event information the calendaring application can create and store an electronic calendar entry. The entry can be presented to the user to confirm as is, indicate planned attendance status, modify before storing, or discard.

In one embodiment, the calendaring application can also present the user with the option of electronically RSVP'ing to an event should the event information include such an option or information for such an option. RSVP methods can include automatically sending a text message, email message or dial a contact number to RSVP or enquire about additional details. In another embodiment, the calendaring application can automatically send an affirmative RSVP notification to the event owner that a user has added the event to his or her calendar. In yet another embodiment, the user may select to not attend the event. In this instance, an automatic decline RSVP can be sent and the event can be maintained in an electronic calendar as not being attended. In one embodiment, the calendaring application can, when permitted by the event owner, also provide the option of sharing the event information with another individual or "pushing" the event, i.e., adding the event to another individual's calendar.

Another aspect of the disclosure can include a system for storing event information from a printed source in an electronic calendar. Such a system can include an event server comprising a storage medium, an event status engine, a barcode creation engine, and an attendee engine. The storage medium can be for storing event ID information as well as their respective properties and attendee lists and status associated with the event and attendees. The event status engine can be utilized to generate information such as event date and time. In one instance, such date and time information can be created after attendees have RSVP'd as attending a certain event and the event status engine has compiled information such as a "best event date and time" based on the potential or confirmed attendees' prior calendar engagements. A barcode creation engine can encode event information in a suitable printable barcode. A barcode can be a linear or matrix barcode. In one embodiment, the barcode creation engine can also perform encryption of data to be encoded in the barcode when so desired. An attendee engine can create and log/record, and track a list of potential, confirmed and denied attendees for a calendar event.

Yet another aspect of the disclosure can include a computer program product that includes a computer readable storage medium having embedded computer usable program code. The computer usable program code can be configured to store event information from a printed source in an electronic calendar. The computer program code can be configured to scan and capture event information associated with an event ID from a printed source. The computer program code can, furthermore, be configured to generate and store the event information from the printed source event ID in a user's electronic calendar depending on user desired application configuration either automatically or upon user confirmation.

In one embodiment, the computer program code can also be configured to store contact information for the event to be utilized for optional RSVP purposes, when applicable, or additional information request purposes. The computer program product can then be configured to allow for instant electronic RSVP options when event information includes an RSVP. Additionally, a separate event can be automatically created and stored for an RSVP deadline associated with an event that can be different from the actual event date.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a depiction of a schematic diagram 100 for storing an event 112 from a printed source 110 in an electronic calendar 140 in accordance with embodiments of the inventive arrangements disclosed herein. The storing of events from a printed source in an electronic calendar can require minimal interaction from a user perspective. This can result in an efficient and convenient and also more comprehensive process for adding the printed event to an electronic calendar than conventional manual entry.

Printed source 110 can be a calendar announcing one or more events 112. A printed source can be any non-interactive visual display. For example, in one embodiment, a printed source can be a publically posted calendar of community events. In another embodiment, a printed source can be an invitation such as a wedding or birthday invitation (displayed in printed form or as a non-interactive electronic message), or a store promotion event. In yet another embodiment, a printed source can be a user purchased GROUPON deal that can contain a specific redemption date or expiration date.

Printed source 110 can include a set 114 of one or more barcodes 120 associated with event 112. Barcode 120 can be a linear or matrix barcode (such as a traditional barcode, a UPC, a QR code, and the like) encoded with event information. Barcode 120 can be in lieu of or in addition to human readable commonly typed specific alphanumeric special text character information. A printed source can have one or more event IDs or bar codes 120 associated with the same event 112 or multiple events 112.

Barcode 120 to be scanned or "captured" by a user can be encoded with an event date 122, an event time 124, and an event location 126. Optionally, the barcode can also contain optional information 127 such as an event contact 128 or an event RSVP 219. Event contact 128 can be a name or contacting method and contacting address for additional information regarding the event. For example, an event contact can be an association's email address, a person's name and telephone number, TWITTER account, IM, an event dedicated web address or FACEBOOK page, and the like. An event RSVP 129 can include an RSVP date deadline, RSVP preferred method (which can be electronic or not) and the like.

It should be noted that a user can scan barcode 120 with a computing device such as, but not limited to, his or her mobile device. A computing device for scanning barcode 120 can include a personal computer, a notebook computer, a netbook, a tablet, a smart phone, a kiosk, a home internet appliance, an embedded system, an entertainment console, and the like. The computing device can include hardware components for a camera to visually capture bar codes in a fashion able to be decoded by the user device. It can be a general purpose computing device able to have its functionality modified by updating or changing installed applications, can be a special purpose computing device designed for a specific set of functionality that is not user modifiable (or minimally so, such as through a firmware upgrade), or can be a device with an intermediate level of user modifiability (i.e., plug-ins or apps can be installed by a user who is otherwise not able to modify core functionality of the device).

Oftentimes mobile devices (for example, smartphones and tablets) link to an individual's electronic calendar (like ICAL-ENDAR or GOOGLE CALENDAR, OUTLOOK, FACE-BOOK EVENTS and the like). These different calendars may in one embodiment synch to one another so only one "capture" of barcode 120 is required to propagate event 112 across an individual's many electronic calendars. For example, the stored calendar event from a printed source can, depending on user preference, auto-populate to an individual's FACE-BOOK events page, or profile.

After receiving event information gathered from scanning barcode 120, calendaring application 130 can either auto-create and store the event 112 in an individual's electronic calendar 140 or optionally present the user with event 112 information for verification, modification, or discarding. Calendaring application 130 can be, for example, a web application, mobile device app (such as for ANDROID or IOS platforms). Calendaring application 130 can present a GUI interface 132 with a user prompt 134 for whether or not to enter the displayed event information to an individual's calendar. Optionally, calendaring application 130 can allow for a user to select 135 a specific calendar to store the event in. For example, an individual may have a work calendar and a social calendar, as well as have access rights to access and modify a coworker's or family member's calendar(s).

A user can accept 136 or decline 138 event 112 as presented 132. Additionally, a user may opt to modify 133 the event information (for example, to add additional notes, extend the event time window to possibly account for travel time, etc). A user can also have the option of setting advanced options 139 for calendaring application 130. Such advanced options can include, but are not limited to, setting user preferred default options or allowing other advanced options such as auto-creation of additional reminder events associated with the main event 112 based on barcode encoded information on RSVP dates, expiration dates associated with for example a GROUPON deal, etc. This can allow for speedier storage of events from a printed source in an electronic calendar.

Additional advanced options can include selecting to store the event 112 in a calendar even though the user may select to not attend event 112. In this instance, a user may elect to auto RSVP "no" to an event but store it in his or her calendar or another individual's calendar regardless to be aware of the event occurring. Regardless of these options, event 112 can be stored in an electronic calendar 140, as event 142. Event 142 can be in the form of a conventional calendar entry in an individual's electronic calendar meaning that event 142 can, in one embodiment, integrate into an individual's calendar seamlessly (i.e., the vent can be visually and functionally manipulated in the electronic calendar's usual GUI with no limitations or user perceived differences).

It should be noted that, in one embodiment, event time and date can be "TBD" (to be determined) when a user elects to accept an event. The event owner can, in one embodiment, provide the information at a later date by having the barcode link to, for example, a webpage or event ID in an event database, which the calendaring application may monitor and track, allowing for dynamic updates of event 142 information. In this instance, or in any instance where event data could change from the moment the event is stored in an electronic calendar from a printed source, calendaring application 130 can alert the user should there be an event update with information of potential conflicts if applicable.

In another embodiment, the event owner (an individual or collective hosting the event or in charge of coordinating the event) can monitor event 112 attendee status based on whether or not an individual has added the event to his or her calendar even if the event information does not include an RSVP option. Additionally, an event owner can limit event 112 sharing options by optionally electing to encrypt the information requiring a user to have a decryption key, or restricting event information from being released unless a predetermined approved calendar is selected to store the event and populate event data to.

Figure 2:
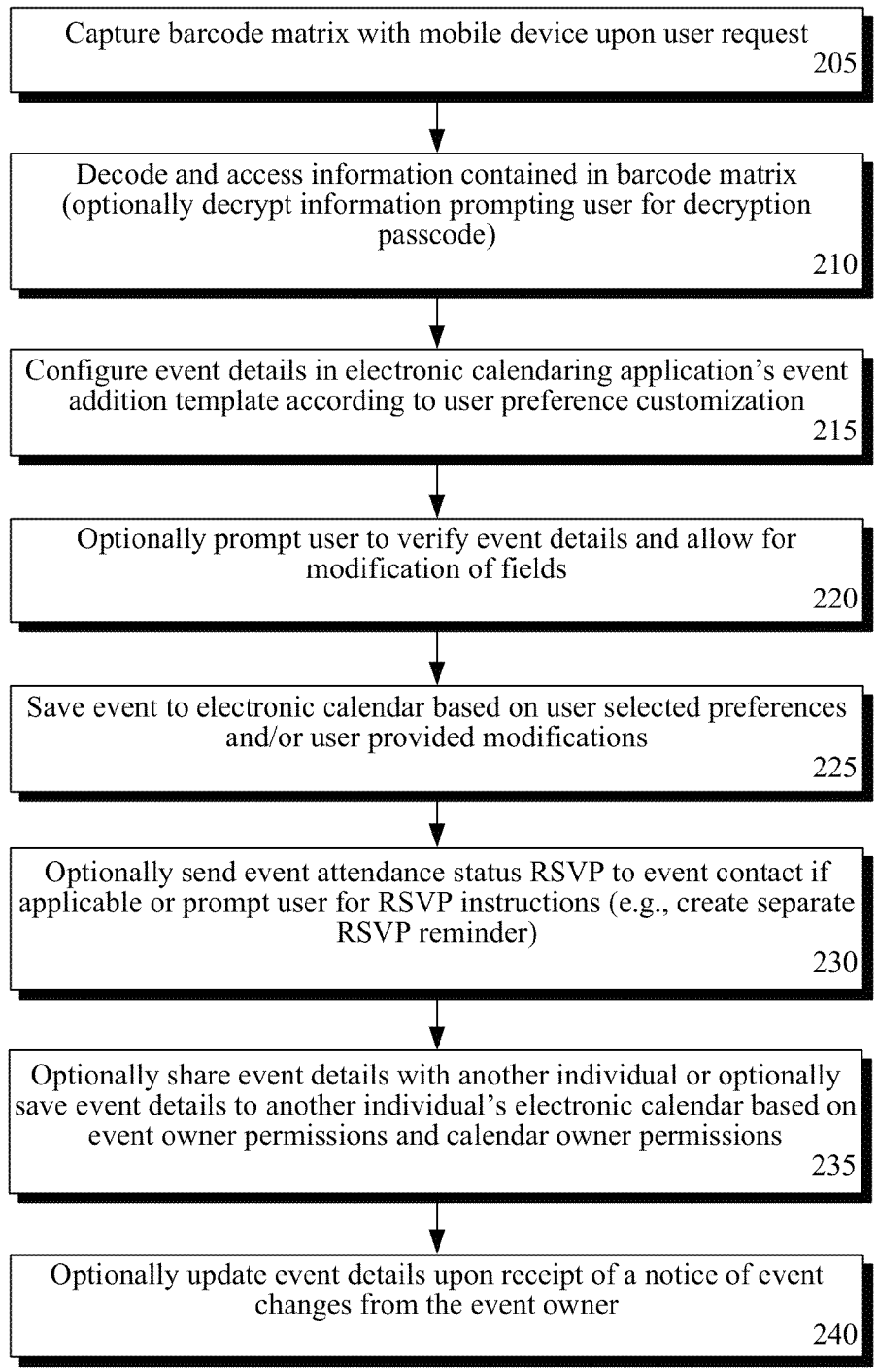
FIG. 2 is a flowchart of a method for storing an event from a printed source in an electronic calendar in accordance with embodiments of the inventive arrangements disclosed herein.

FIG. 2 is a flowchart of a method 200 for storing an event from a printed source in an electronic calendar in accordance with embodiments of the inventive arrangements disclosed herein. The method can include steps 205 through 240 but it should be understood that any configuration of the steps and optional components of the method can occur in another order than the one shown in FIG. 2. Moreover, additional optional steps are contemplated.

The method 200 can begin in step 205 where the barcode matrix is captured with a user's mobile device upon user request or initiation. The barcode can be captured using a mobile device's camera, specialized scanner, and the like. The method can then move onto step 210, during which the mobile device can decode and access event information contained within the scanned barcode matrix from step 205. Optionally in step 210, when necessary, the mobile device can decrypt the event information contained in the barcode matrix, either prompting the user for a decryption passcode or relying on a previously stored passcode, and the like.

Decryption of event information can, as briefly touched upon in FIG. 1, be beneficial for example in save the date invitations or events where attendance is restricted and/or event information is intended to be private to a certain group (such as school children's parents or club members who meet in a public location) but is disseminated publicly. Passcodes could be any method for security checks and can be as simple or sophisticated in nature as, for example, PIN codes, passwords, gesture based patterns, biometric indicia, and the like.

In step 215, event details can be configured in the user's electronic calendaring application's event addition template according to user preference customization. For example, date ranges, times of the event, location and RSVP information if applicable can be auto-populated in the "new event" template of the electronic calendar application. In step 220, the user can be optionally prompted to verify event details and can also be allowed to modify event information fields before saving.

The method can then proceed to step 225 where the event can be saved to the electronic calendar based on user selected preferences and/or user provided modifications. For example, the user can have selected which calendar to save the event to, an attendance status, associated reminders and alerts, tasks to be completed before the event (such as, for example, purchasing a hostess gift for a dinner party event or new running shoes for a marathon event, etc.) and the like.

Additional optional steps are contemplated after the method results in the saving of event information to the electronic calendar in step 225. For example, in step 230, event attendance status RSVP can optionally be sent to one or more event contacts if applicable and provided with the event information or the user can be prompted for specific RSVP instructions (e.g., creating a separate RSVP reminder or RSVP deadline event).

In step 235, event details in their original scanned form or their user modified form can optionally be shared with another individual or optionally saved to another individual's electronic calendar based on event owner permissions and calendar owner permissions. Sharing can be restricted in various ways, for example, no sharing of event details at all, sharing with one individual (as a "plus one" guest), sharing only allowed within a family, club member group, work colleagues, and the like. Additionally, in step 240, the method can optionally allow for updating of event details or accompanying information in all attendees' calendars or select attendees' calendars based upon receipt of a notice of event changes from the event owner.

Figure 3:
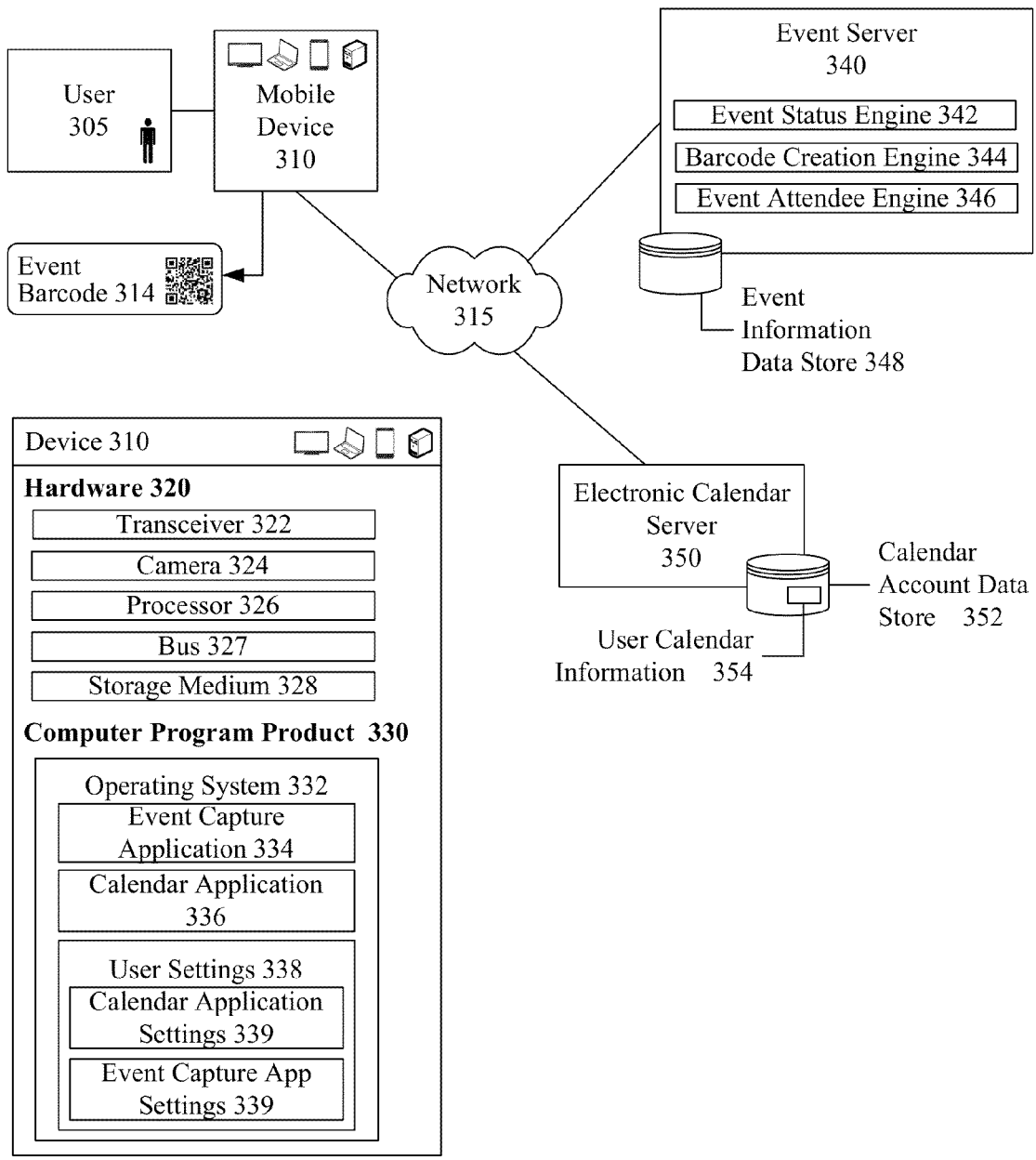
FIG. 3 is a system for storing an event from a printed source in an electronic calendar in accordance with embodiments of the inventive arrangements disclosed herein.

FIG. 3 is a system 300 for storing an event from a printed source in an electronic calendar in accordance with embodiments of the inventive arrangements disclosed herein. Such a system can include an event server comprising a storage medium, an event status engine, a barcode creation engine, and an attendee engine. The system 300 can include interactions between a user 305 with his or her mobile device 310, an event server 340, and an electronic calendar server 350 over network 315. Network 315 can facilitate data exchanges over wireless as well as line-based communication pathways and protocols.

User 305 can utilize mobile device 310 to scan an event barcode 314 from a printed source to initiate a sequence of events that lead to the event from the printed source to be stored in an electronic calendar. Device 310 can be any of a variety of devices including, but not limited to, a personal computer, a telephone, a personal data assistant (PDA), a mobile phone, a tablet, and the like. Device 310 can include hardware 320, such as a transceiver 322, a camera 324, as well as a processor 326, a storage medium 328, and a bus 327 connecting them. The hardware can execute computer program products 330 (software/firmware) that is stored in a non-transitory storage medium.

Computer program products 330 can include an operating system 332 upon which a number of applications can operate. Such applications can include an event capture application 334 and a calendar application 336. The event capture application 334 can in one embodiment work in conjunction with the electronic calendar application 336 or in another embodiment be incorporated into the calendar application 336. Computer program product 330 can further include user settings 337 which can in turn include calendar application settings 338 as well as event capture application settings 339.

Calendar application settings 338 can include user preferences for default alarms or reminders associated with events, default attendance status, sharing of event preferences, and the like. Event capture settings can include options such as when to initiate scanning of event barcodes, when to save the scanned or captured event (automatically or upon user prompt, etc.), default calendar to save events to, types of events to automatically save vs. prompt for, and the like.

Electronic event barcodes 314 on a printed source can be generated from an event server 340, which can include an event status engine 342, a barcode creation engine 344, an event attendee engine 346 and an event information data store 348. Event status engine 342 can maintain event specific information such as time and date, location, RSVP contact information and the like. Attendee engine 346 can create and log/record, and track a list of potential, confirmed and denied attendees for a calendar event. Barcode creation engine 344 can be utilized to transform and encode the information captured and maintained by the event status engine 342 into a barcode matrix to be presented on a printed source. Barcode creation engine 344 can also, in one embodiment, perform encryption of the event data to be encoded in the barcode.

In one instance, event date and time information can be created after attendees have RSVP'd as attending a certain event and the event status engine has compiled information such as a "best event date and time" based on the potential or confirmed attendees' prior calendar engagements. As previously mentioned, the barcodes can be any of a linear or matrix barcode (such as a traditional barcode, a UPC, a QR code, and the like) encoded with event information. The barcode 314 can be in lieu of or in addition to human readable commonly typed specific alphanumeric special text character information. It should be noted that any one event can have one or more event barcodes 314 associated with it.

Electronic calendar server 350 can maintain electronic calendars for individuals such as user 305. Events captured from a printed source barcode 314 can be stored and maintained in a user's electronic calendar maintained in the electronic calendar server 350 and its associated data store 352. Electronic calendar server 350 can include calendar account data store 352 which can maintain user calendar information 354. Such user calendar information 354 can be utilized, in one embodiment, by event status engine 342 to determine a suitable time for an event with a "find a time" designation allowing for, as previously mentioned, a suitable time and date for an event to be set that is dependent upon attendees' availability.

As shown herein, data stores 348, 352 and the like can be physically implemented within any type of hardware including, but not limited to, a magnetic disk, an optical disk, a semiconductor memory, a digitally encoded plastic memory, a holographic memory, or any other recording medium. Each of the data stores 348, 352 can be stand-alone storage units as well as a storage unit formed from a plurality of physical devices, which may be remotely located from one another. Additionally, information can be stored within each data store 348, 352 in a variety of manners. For example, information can be stored within a database structure or can be stored within one or more files of a file storage system, where each file may or may not be indexed for information searching purposes.

The network 315 can include any hardware/software/firmware necessary to convey digital content encoded within carrier waves. Content can be contained within analog or digital signals and conveyed through data or voice channels and can be conveyed over a personal area network (PAN), a local area network (LAN), or a wide area network (WAN). The network 315 can include local components and data pathways necessary for communications to be exchanged among computing device components and between integrated device components and peripheral devices. The network 315 can also include network equipment, such as routers, data lines, hubs, and intermediary servers which together form a packet-based network, such as the Internet or an intranet. The network 315 can further include circuit-based communication components and mobile communication components, such as telephony switches, modems, cellular communication towers, and the like. The network 315 can include line based and/or wireless communication pathways.

Figure 4:
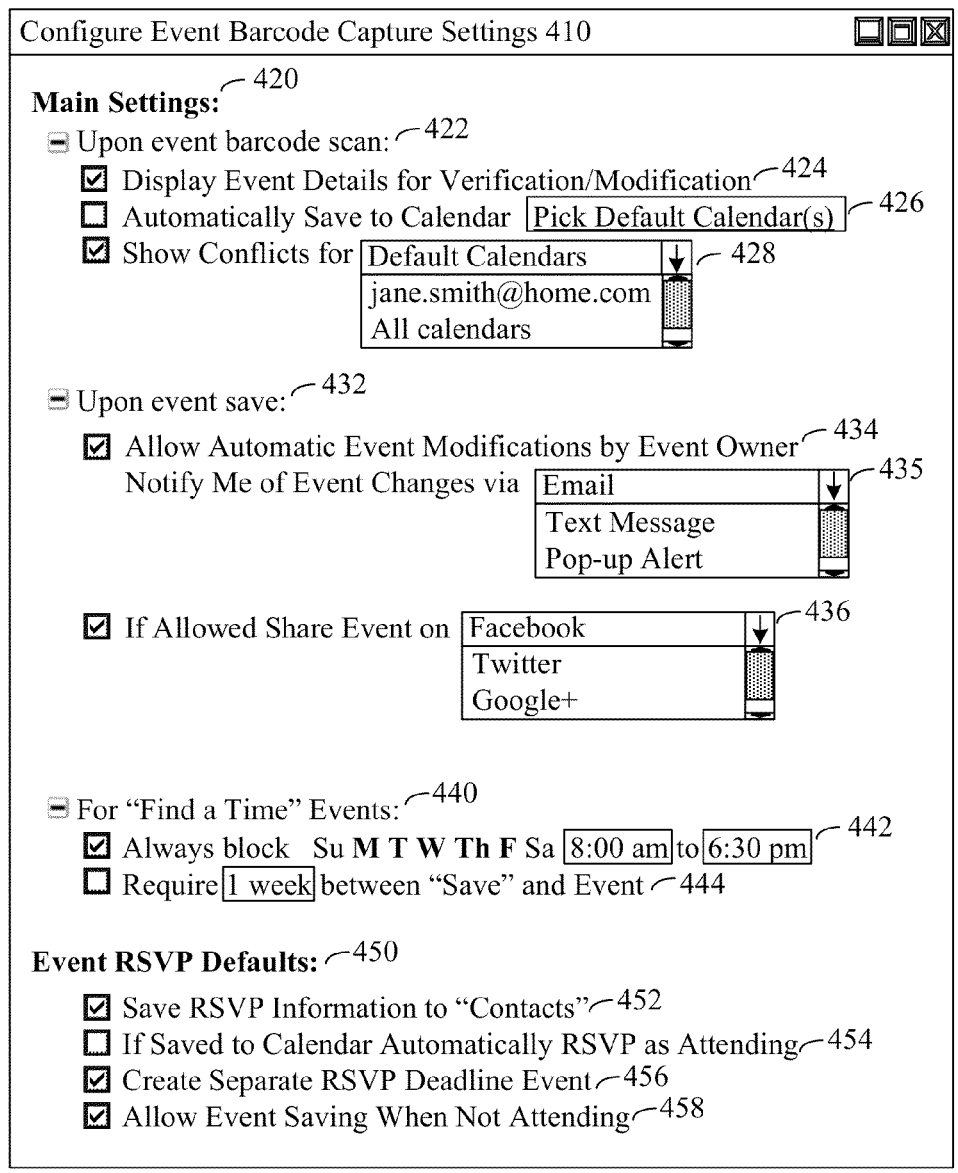
FIG. 4 is a depiction of a user preference GUI for storing an event from a printed source in an electronic calendar in accordance with embodiments of the inventive arrangements disclosed herein.

FIG. 4 is a depiction 400 of a user preference GUI 410 for storing an event from a printed source in an electronic calendar in accordance with embodiments of the inventive arrangements disclosed herein. In the example GUI 410 shown in this figure, GUI 420 to configure event barcode capture settings can include options for main settings 420, such as options for event barcode scan 422, event save 432, and "find a time" events, as well as options for event RSVP defaults 450.

For example, a user can configure certain options for what is to happen upon event barcode scan 422. The device could in one embodiment display event details for verification and/or user modification 424 or in another embodiment automatically save the event to an electronic calendar 426. Selecting the option to automatically save the event to a calendar 426 can also include an option for picking one or more default calendars to save the event to. An additional selection to show always conflicts for calendars 428, such as default calendars, all calendars, a specific calendar (e.g., jane.smith@home.com) and the like, can provide the user with instant feedback on a new event's attendance possibility. The user can thus make a more informed decision about whether to save the captured event information to his or her electronic calendar.

Additional user selectable and configurable options can apply to once an event has been saved 432 to an electronic calendar. Such options can include but are not limited to allowing automatic event modifications by the event owner or host 434 (as maintained through event server 340 of FIG. 3) along with an option to notify the user of event changes via a set of selectable methods 435 (e.g., email, text message, pop-up alert, and the like). Moreover, an option to share the captured event information on social networking sites such as FACEBOOK, TWITTER, GOOGLE+, and the like can be provided if event owner settings permit such sharing.

GUI 41 for configuring event barcode capture settings can also include settings for "Find a Time" events 440, such as an option to always block certain days of the week with or without an accompanying time slot (e.g., Mon-Fri from 8:00 am to 6:30 pm, thereby ensuring the event would not be scheduled during regular work hours) or to require a selected timeframe (e.g., one week) 444 between the event "Save" and the actual event date and time (thereby, for example, giving the event attendee enough notice to arrange for a babysitter for his or her children or the like).

Event RSVP defaults 450 can also be included in a GUI 410 for events information that contains relevant RSVP information (for example, RSVP deadlines, contact addresses in the form of telephone numbers or email addresses, and the like). Such RSVP defaults can include whether or not to save RSVP information to "contacts" or address book 452 and whether or not to automatically RSVP for electronic RSVP options in the event that an event is saved to an electronic calendar as a user attending 454. Further RSVP default options can include creating a separate RSVP deadline event 456 as well as allowing a user to save the event when the user has elected not to attend 458. It should be noted that the above mentioned configuration and preference options are not intended to be limiting. Other options and user settings for storing events from a printed source in an electronic calendar are contemplated.

The diagrams in the figure illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A method comprising:
one or more processors, executing program instructions stored on a non-transitory storage medium, populating event information of an event into a plurality of electronic calendar event information fields of an electronic calendar of a user, wherein each of the plurality of information fields is populated using the event information, obtained from a single optical scan of a bar code for the event, wherein the bar code comprises the event information optically encoded within the bar code or comprises a link encoded within the bar code to a Web source from which the event information is automatically obtained, wherein a mobile device of the user scans the bar code, said method further comprising:
one or more processors, executing program instructions stored on a non-transitory storage medium, determining the electronic calendar of the user from among a plurality of electronic calendars of different users by looking up which of the plurality of electronic calendars corresponds to a previously stored unique identifier of the mobile device, wherein the populating of the event information occurs automatically to the electronic calendar of the user responsive to the determining.

2. The method of claim 1, wherein the one or more processors performing the populating of the event information and wherein the one or more processors performing the determining of the electronic calendar are one or more processors of an electronic calendar server maintaining the electronic calendar of the user, wherein the electronic calendar server is remotely located from the mobile device and wherein the electronic calendar server is communicatively linked to the mobile device via a network.

3. The method of claim 1, further comprising:
one or more processors, executing program instructions stored on a non-transitory storage medium, determining a computing device from which the single optical scan is conducted as being the mobile device;
one or more processors, executing program instructions stored on a non-transitory storage medium, determining an identity of a person recorded as a default user of the computing device, wherein the user is ascertained from the identity;
one or more processors, executing program instructions stored on a non-transitory storage medium, querying a data store to find a previously stored calendar login identity and password for the user within an electronic calendar server that maintains the electronic calendar of the user; and
one or more processors, executing program instructions stored on a non-transitory storage medium, automatically logging onto the electronic calendar server using the calendar login identity and password in order to automatically populate the event information of the event into the plurality of electronic calendar event information fields of the electronic calendar of a user, wherein the one or more processors performing the populating of the event information and wherein the one or more processors performing the determining of the electronic calendar are one or more processors of an electronic calendar server.

4. The method of claim 1, wherein the bar code comprises the event information optically encoded within the bar code.

5. The method of claim 1, wherein the bar code comprises the link encoded within the bar code to the Web source from which the event information is automatically obtained.

6. The method of claim 1, wherein the single optic scan results from an interaction by the user, wherein no additional input is required from the user and no additional input is required from any other human to populate the event information into the electronic calendar information fields of the electronic calendar of the user.

7. The method of claim 1, further comprising:
one or more processors, executing program instructions stored on a non-transitory storage medium, determining within the event information RSVP information for the event; and
one or more processors, executing program instructions stored on a non-transitory storage medium, automatically, responsive to the single optical scan of the bar code, conveying an RSVP message to an event coordinator account to which a response message is to be sent, said event coordinator account being determined from the RSVP information, wherein the RSVP message indicates that the user plans to attend the event.

8. The method of claim 1, wherein the bar code is a matrix barcode.

9. The method of claim 1, wherein the bar code is a linear barcode.

10. An apparatus comprising:
one or more processors;
one or more non-transitory storage mediums; and
program instructions stored on the one or more non-transitory storage mediums, wherein the one or more processors execute the program instructions causing the apparatus to:
populate event information of an event into a plurality of electronic calendar event information fields of an electronic calendar of a user, wherein each of the plurality of information fields is populated using the event information, obtained from a single optical scan of a bar code for the event, wherein the bar code comprises the event information optically encoded within the bar code or comprises a link encoded within the bar code to a Web source from which the event information is automatically obtained, wherein a mobile device of the user scans the bar code, wherein the one or more processors execute the program instructions causing the apparatus to further:
determine the electronic calendar of the user from among a plurality of electronic calendars of different users by looking up which of the plurality of electronic calendars corresponds to a previously stored unique identifier of the mobile device, wherein the populating of the event information occurs automatically to the electronic calendar of the user responsive to the determining.

11. The apparatus of claim 10, wherein the one or more processors and the one or more non-transitory storage mediums are hardware components of an electronic calendar server maintaining the electronic calendar of the user.

12. The apparatus of claim 10, wherein the one or more processors execute the program instructions causing the apparatus to further:
   determine a computing device from which the single optical scan is conducted as being the mobile device;
   determine an identity of a person recorded as a default user of the computing device, wherein the user is ascertained from the identity;
   query a data store to find a previously stored calendar login identity and password for the user within an electronic calendar server that maintains the electronic calendar of the user; and
   automatically log onto the electronic calendar server using the calendar login identity and password in order to automatically populate the event information of the event into the plurality of electronic calendar event information fields of the electronic calendar of a user, wherein the one or more processors and the one or more non-transitory storage mediums are hardware components of an electronic calendar server maintaining the electronic calendar of the user.

13. The apparatus of claim 10, wherein the bar code comprises the event information optically encoded within the bar code.

14. The apparatus of claim 10, wherein the bar code comprises the link encoded within the bar code to the Web source from which the event information is automatically obtained.

15. The apparatus of claim 10, wherein the single optic scan results from an interaction by the user, wherein no additional input is required from the user and no additional input is required from any other human to populate the event information into the electronic calendar information fields of the electronic calendar of the user.

16. The apparatus of claim 10, wherein a mobile device of the user scans the bar code, wherein the one or more processors execute the program instructions causing the apparatus to further:
   determine within the event information RSVP information for the event; and
   automatically, responsive to the single optical scan of the bar code, convey an RSVP message to an event coordinator account to which a response message is to be sent, said event coordinator account being determined from the RSVP information, wherein the RSVP message indicates that the user plans to attend the event.

17. A non-transitory storage device or medium comprising:
   program instructions stored on the non-transitory storage device or medium, wherein the program instructions are executable by one or more processors to:
   populate event information of an event into a plurality of electronic calendar event information fields of an electronic calendar of a user, wherein each of the plurality of information fields is populated using the event information, obtained from a single optical scan of a bar code for the event, wherein the bar code comprises the event information optically encoded within the bar code or comprises a link encoded within the bar code to a Web source from which the event information is automatically obtained, wherein a mobile device of the user scans the bar code, wherein the program instructions are executable by one or more processors to:
   determine the electronic calendar of the user from among a plurality of electronic calendars of different users by looking up which of the plurality of electronic calendars corresponds to a previously stored unique identifier of the mobile device, wherein the populating of the event information occurs automatically to the electronic calendar of the user responsive to the determining.

18. The non-transitory storage device or medium of claim 17, wherein the one or more processors and the one or more non-transitory storage device or medium are hardware components of an electronic calendar server maintaining the electronic calendar of the user.

19. The non-transitory storage device or medium of claim 17, wherein the program instructions are executable by one or more processors to further:
   determine a computing device from which the single optical scan is conducted as being the mobile device;
   determine an identity of a person recorded as a default user of the computing device, wherein the user is ascertained from the identity;
   query a data store to find a previously stored calendar login identity and password for the user within an electronic calendar server that maintains the electronic calendar of the user; and
   automatically log onto the electronic calendar server using the calendar login identity and password in order to automatically populate the event information of the event into the plurality of electronic calendar event information fields of the electronic calendar of a user, wherein the one or more processors and the one or more non-transitory storage device or medium are hardware components of an electronic calendar server maintaining the electronic calendar of the user.

20. The non-transitory storage device or medium of claim 17, wherein the program instructions are executable by one or more processors to further:
   determine within the event information RSVP information for the event; and
   automatically, responsive to the single optical scan of the bar code, convey an RSVP message to an event coordinator account to which a response message is to be sent, said event coordinator account being determined from the RSVP information, wherein the RSVP message indicates that the user plans to attend the event.

21. A method comprising:
   one or more processors, executing program instructions stored on a non-transitory storage medium, populating event information of an event into a plurality of electronic calendar event information fields of an electronic calendar of a user, wherein each of the plurality of information fields is populated using the event information, obtained from a single optical scan of a bar code for the event, wherein the bar code comprises the event information optically encoded within the bar code or comprises a link encoded within the bar code to a Web source from which the event information is automatically obtained;
   one or more processors, executing program instructions stored on a non-transitory storage medium, detecting a computing device from which the single optical scan is conducted;
   one or more processors, executing program instructions stored on a non-transitory storage medium, determining an identity of a person recorded as a default user of the computing device, wherein the user is ascertained from the identity;
   one or more processors, executing program instructions stored on a non-transitory storage medium, querying a data store to find a previously stored calendar login identity and password for the user within an electronic calendar server that maintains the electronic calendar of the user; and one or more processors, executing program instructions stored on a non-transitory storage medium, automatically logging onto the electronic calendar server using the calendar login identity and password in order to automatically populate the event information of the event into the plurality of electronic calendar event information fields of the electronic calendar of a user.

22. The method of claim 21, wherein a mobile device of the user scans the bar code, said method further comprising:

one or more processors, executing program instructions stored on a non-transitory storage medium, determining the electronic calendar of the user from among a plurality of electronic calendars of different users by looking up which of the plurality of electronic calendars corresponds to a previously stored unique identifier of the mobile device, wherein the populating of the event information occurs automatically to the electronic calendar of the user responsive to the determining.

23. The method of claim 21, wherein a mobile device of the user scans the bar code.

24. The method of claim 21, wherein the bar code comprises the event information optically encoded within the bar code.

25. The method of claim 21, wherein the bar code comprises the link encoded within the bar code to the Web source from which the event information is automatically obtained.

26. The method of claim 21, wherein the single optic scan results from an interaction by the user, wherein no additional input is required from the user and no additional input is required from any other human to populate the event information into the electronic calendar information fields of the electronic calendar of the user.

27. The method of claim 21, further comprising:

one or more processors, executing program instructions stored on a non-transitory storage medium, determining within the event information RSVP information for the event; and one or more processors, executing program instructions stored on a non-transitory storage medium, automatically, responsive to the single optical scan of the bar code, conveying an RSVP message to an event coordinator account to which a response message is to be sent, said event coordinator account being determined from the RSVP information, wherein the RSVP message indicates that the user plans to attend the event.

28. The method of claim 21, wherein the bar code is a matrix barcode.

29. The method of claim 21, wherein the bar code is a linear barcode.

30. An apparatus comprising:
one or more processors;
one or more non-transitory storage mediums; and
program instructions stored on the one or more non-transitory storage mediums, wherein the one or more processors execute the program instructions causing the apparatus to:
populate event information of an event into a plurality of electronic calendar event information fields of an electronic calendar of a user, wherein each of the plurality of information fields is populated using the event information, obtained from a single optical scan of a bar code for the event, wherein the bar code comprises the event information optically encoded within the bar code or comprises a link encoded within the bar code to a Web source from which the event information is automatically obtained;

detect a computing device from which the single optical scan is conducted;

determine an identity of a person recorded as a default user of the computing device, wherein the user is ascertained from the identity;

query a data store to find a previously stored calendar login identity and password for the user within an electronic calendar server that maintains the electronic calendar of the user; and automatically log onto the electronic calendar server using the calendar login identity and password in order to automatically populate the event information of the event into the plurality of electronic calendar event information fields of the electronic calendar of a user.

31. The apparatus of claim 30, wherein a mobile device of the user scans the bar code, wherein the one or more processors execute the program instructions causing the apparatus to further:

determine the electronic calendar of the user from among a plurality of electronic calendars of different users by looking up which of the plurality of electronic calendars corresponds to a previously stored unique identifier of the mobile device, wherein the populating of the event information occurs automatically to the electronic calendar of the user responsive to the determining.

32. The apparatus of claim 30, wherein a mobile device of the user scans the bar code.

33. The apparatus of claim 30, wherein the bar code comprises the event information optically encoded within the bar code.

34. The apparatus of claim 30, wherein the bar code comprises the link encoded within the bar code to the Web source from which the event information is automatically obtained.

35. The apparatus of claim 30, wherein the single optic scan results from an interaction by the user, wherein no additional input is required from the user and no additional input is required from any other human to populate the event information into the electronic calendar information fields of the electronic calendar of the user.

36. The apparatus of claim 30, wherein a mobile device of the user scans the bar code, wherein the one or more processors execute the program instructions causing the apparatus to further:

determine within the event information RSVP information for the event; and automatically, responsive to the single optical scan of the bar code, convey an RSVP message to an event coordinator account to which a response message is to be sent, said event coordinator account being determined from the RSVP information, wherein the RSVP message indicates that the user plans to attend the event.

37. A non-transitory storage device or medium comprising:
program instructions stored on the non-transitory storage device or medium, wherein the program instructions are executable by one or more processors to:
populate event information of an event into a plurality of electronic calendar event information fields of an electronic calendar of a user, wherein each of the plurality of information fields is populated using the event information, obtained from a single optical scan of a bar code for the event, wherein the bar code comprises the event information optically encoded within the bar code or comprises a link encoded within the bar code to a Web source from which the event information is automatically obtained;

detect a computing device from which the single optical scan is conducted;

determine an identity of a person recorded as a default user of the computing device, wherein the user is ascertained from the identity;

query a data store to find a previously stored calendar login identity and password for the user within an electronic calendar server that maintains the electronic calendar of the user; and automatically log onto the electronic calendar server using the calendar login identity and password in order to automatically populate the event information of the event into the plurality of electronic calendar event information fields of the electronic calendar of a user.

38. The non-transitory storage device or medium of claim 37, wherein a mobile device of the user scans the bar code, wherein the program instructions are executable by one or more processors to:

determine the electronic calendar of the user from among a plurality of electronic calendars of different users by looking up which of the plurality of electronic calendars corresponds to a previously stored unique identifier of the mobile device, wherein the populating of the event information occurs automatically to the electronic calendar of the user responsive to the determining.

39. The non-transitory storage device or medium of claim 37, wherein a mobile device of the user scans the bar code.

40. The non-transitory storage device or medium of claim 37, wherein the program instructions are executable by one or more processors to further:

determine within the event information RSVP information for the event; and automatically, responsive to the single optical scan of the bar code, convey an RSVP message to an event coordinator account to which a response message is to be sent, said event coordinator account being determined from the RSVP information, wherein the RSVP message indicates that the user plans to attend the event.

* * * * *